June 21, 1949. C. A. TOBIAS 2,473,922
BREATHING INDICATOR
Filed Oct. 29, 1945 2 Sheets-Sheet 1

INVENTOR.
CORNELIUS A. TOBIAS
BY
ATTORNEYS

June 21, 1949.  C. A. TOBIAS  2,473,922
BREATHING INDICATOR
Filed Oct. 29, 1945  2 Sheets-Sheet 2

INVENTOR.
CORNELIUS A. TOBIAS
BY
ATTORNEYS

Patented June 21, 1949

2,473,922

UNITED STATES PATENT OFFICE 2,473,922

BREATHING INDICATOR

Cornelius A. Tobias, Berkeley, Calif.

Application October 29, 1945, Serial No. 625,146

8 Claims. (Cl. 177—311)

The invention described herein may be manufactured and used by or for the Government of the United States for governmental purposes, without the payment to me of any royalty thereon.

This invention relates to breathing indicators such as may be used in aircraft when operating at high altitudes to indicate the condition of personnel located at remote stations on the aircraft so as to give a signal at a central station when their breathing becomes highly irregular or ceases altogether.

Since aircraft and more particularly bombers have begun operations in high altitudes, i. e., altitudes in excess of 15,000 to 18,000 feet, many personnel have been lost because of failure to breathe or failure of their oxygen supply without any possibility of warning other personnel who might come to their assistance.

The best figures now available as to the result of loss of oxygen supply at high altitudes is illustrated in the graph comprising Figure 3 of the accompanying drawing forming a part of this specification, wherein it is clearly evident that unless aid reaches a person suffering from anoxemia or anoxia within a very few minutes, death will result. On the other hand, a person in the initial phases of anoxemia can be revived if aid arrives in sufficient time. As a result, it is highly important that the aircraft pilot or some person located at a central station be apprised immediately of any unsafe condition of the personnel at outlying stations.

Accordingly, it is an object of the present invention to provide a signalling system which will connect the remote stations of an aircraft with the central station and provide a signal of any unsafe or dangerous condition of a person at a remote station which is reflected in his breathing.

Another object of the invention is to provide a signalling system or indicator of the above character which is responsive to the loss of oxygen supply at a remote station to operate a signal at the central station.

Another object of the invention is to provide a system of the above character in which the operation of the system is dependent upon a person at a remote station continuing to breathe through his oxygen supply system at a normal rate.

This invention further aims to provide a breathing indicator which is of simple and dependable construction, which is light in weight, occupies little space, is easily installed and maintained and as readily removed for inspection or replacement, requires little power, and is readily adaptable for use with oxygen equipment already standardized for military and naval service.

Other objects and advantages of the invention will be apparent from the following description of certain preferred embodiments thereof as illustrated in the accompanying drawings, in which.

Figure 1:
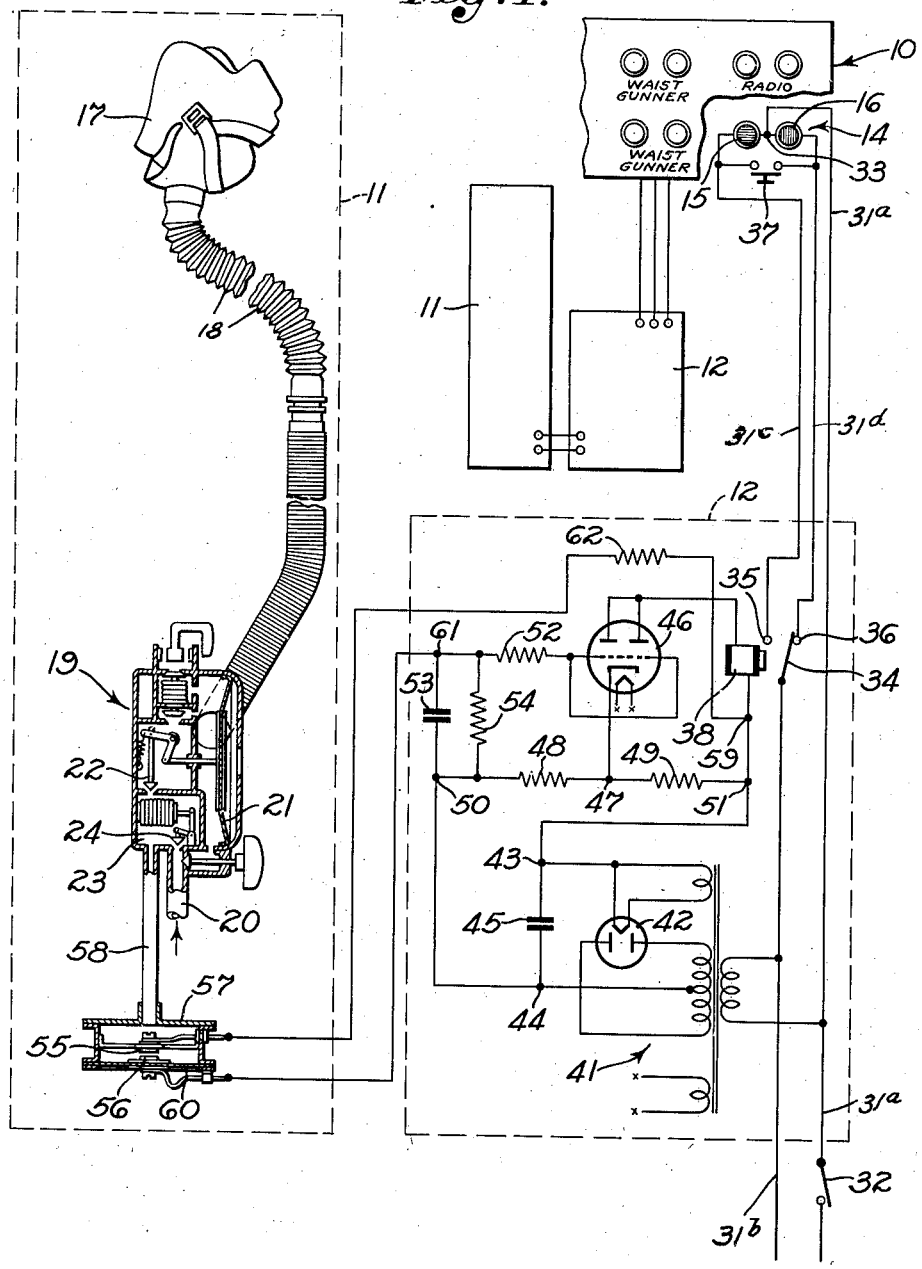
Figure 1 is a diagrammatic view illustrating the relation of a signal panel at a central station to control equipment located at various remote stations.

Referring to Figure 1, the signalling system of the instant invention may comprise a central station 10 such as the pilot's station or cockpit of an aircraft and a plurality of remote stations 11 of the aircraft, each having detecting apparatus in the form of a control circuit 12 associated therewith. The central station 10 may comprise a signal panel having a plurality of remote station signals 14 which, in the form shown, may comprise two signal lamps 15 and 16. The various remote station signals 14 may be appropriately indicated by legends, for example, "waist gunner," "radio," "bombardier," etc. marked in any suitable manner on the signal panel 10.

Each remote station 11 may comprise an oxygen mask 17 of conventional construction which is connected by flexible tubing 18 to an oxygen demand regulator 19 of conventional construction which in turn is connected to an oxygen supply pipe 20. The oxygen demand regulator 19 is designed to operate in response to inhalation and exhalation of the person wearing the oxygen mask to provide a continuous supply of oxygen by means including a differential pressure device or diaphragm 21 which is connected to control a valve 22 cooperating with a pressure reducing chamber 23 of the regulator to which the supply pipe 20 is connected. A bellows-controlled valve 24 controls the flow of oxygen from the oxygen pipe 20 to chamber 23, the construction being such that when pressure in the chamber is reduced, the valve 24 opens to admit oxygen under pressure to the chamber. In operation, as the person wearing the mask breathes the pressure differential created on the diaphragm 21 causes a release of oxygen to the oxygen mask which, in turn, will cause a release of oxygen to the pressure chamber 23. As a result, the pressure chamber 23 is subject to pressure fluctuations in response to breathing of a person wearing the oxygen mask. As oxygen demand regulators of the type disclosed herein are well known, a detailed description thereof is omitted.

According to the present invention, the pressure fluctuations in the chamber 23 are utilized in producing a signal at the central station when these pressure fluctuations do not occur at regular time intervals, i. e., whenever they cease or become too far below the normal breathing rate.

As the control mechanism 12 for operating the signal is similar for each of the remote stations, only one of these will be described in detail.

To operate the control circuit of the detecting apparatus, a pair of leads 31a, 31b are connected with a source of alternating current not shown, and a single pole switch 32 is provided to serve as an energizing and cut-off switch for the remote station. Lead 31a is connected to a central terminal 33 between the lamps 15 and 16 on the signal panel 10 at the central station. The other lead 31b is connected to a narmature switch 34 adapted to make contact with either of terminals 35 and 36 having conductors 31c, 31d connected respectively to the lamps 15 and 16. For the purpose of testing said lamps, a manual switch 37 has conductors 37a, 37b connected to leads 31c, 31d, so that both lamps 15 and 16 may be lit at the same time, provided switch 32 is closed and armature switch 34 is in contact with either terminal 35 or 36. The armature switch 34 is normally biased to the position shown, engaging the contact terminal 36 so that the danger lamp 16 is lit when its circuit is complete. The switch 34 cooperates with and forms part of a relay 38 which is operated by the control circuit about to be described.

The control circuit has a source of potential including a transformer rectifier circuit 41 having a rectifier tube 42 with its positive and negative terminals 43 and 44 respectively connected to a filter condenser 45. The control circuit also includes a dual triode 46 having its anodes or plates connected through the winding of the relay 38 to the positive terminal 43 of the rectifier tube 42. The cathode of the dual triode 46 is connected to a terminal 47 forming a tap of a voltage divider including resistors 48 and 49 connected by terminals 50 and 51 respectively across the positive and negative terminals of the rectifier tube 42. The resistor 49 is relatively high in value with respect to the value of the resistor 48 so that the cathode of the dual triode 46 is relatively negative. The respective grids of the dual triode 46 are connected through a grid current limiting resistor 52 to one end of a resistor-condenser time network including condenser 53 and resistor 54, the other end of this network being connected to the terminal 50 and the negative 44 of the rectifier tube 42.

The operating control for the circuit described above may comprise a set of contacts 55 and 56, the contact 55 being mounted within a housing 57 providing a pressure chamber which is connected by the pipe 58 to the pressure reducing chamber 23 of the oxygen demand regulator. The contact 55 is electrically connected to a terminal 59 which is ahead of the relay 38 in the connection leading to the positive terminal 43 of the rectifier tube. The contact 56 is carried by a flexible diaphragm 60 forming one wall of the housing 57 and is electrically connected to terminal 61 at one side of the resistor-condenser network 53 and 54.

Operation

As previously stated, a person wearing the oxygen mask will cause alternate increases and decreases in pressure within the chamber 23 and consequently within the housing 57 so that the pressure differential to which the diaphragm 60 is subjected varies with each inhalation and exhalation of the person wearing the oxygen mask. The strength of the diaphragm 60 is so selected that the reduction in pressure within the housing 57 will cause closing of the contacts 55—56 while the increase of pressure therein will cause opening of these contacts so that a signal is applied to the control circuit at an interval depending upon the rate of breathing of the person wearing the oxygen mask.

With the parts as shown in Figure 1, i. e., with the contacts 55—56 open, a relatively negative bias is applied from the rectifier tube 42 by way of the bleeder resistor 54 and the grid current limiting resistor 52 to the control grids of the dual triode 46, so that the triode is biased to cut off current entirely or to pass a current so weak that the relay 38 is not operated. At this time the red or danger lamp 16 is energized, as previously explained.

When contact 56 is moved to engage contact 55, the positive terminal 43 of the rectifier tube 42 is connected through the current limiting resistor 62, the contacts 55—56 and the grid current limiting resistor 52 to the control grids of the dual triode 46, whereby the triode 46 is rendered more conductive and will pass sufficient current to cause the relay 38 to operate and thereby shift the armature 34 from engagement with the terminal 36 to the terminal 35. This results in extinguishing the "danger" lamp 16 and energizing the "safe" lamp 15. At this time the condenser 53 is placed directly on charge across the positive and negative terminals of the rectifier tube through the current limiting resistor 62.

When the contact 56 is moved away from the associated contact 55, the circuit for charging the condenser 53 is interrupted and the connection between the positive potential of the rectifier tube 42 and the grids of the dual triode 46 is interrupted, whereby the condenser 53 begins to discharge through the associated bleeder resistor 54. During the discharge of the condenser 53 the terminal 61 is relatively positive and maintains the control grids of the dual triode 46 at a relatively positive potential to maintain the triode sufficiently conductive to maintain the relay 38 in its operated position.

Unless the contacts 55—56 are again closed within the time interval for discharge of the condenser 53, the negative potential of the rectifier tube 42 will be again impressed through the grid current limiting resistor 52 so that a negative bias will be restored to the control grids of the dual triode 46. As a result the plate current will be reduced a sufficient amount to de-energize the relay 38, and the armature 34 will be restored to its "danger" position.

Preferably, the time constant of the resistor-condenser network 53—54 is so selected, about 15 seconds, that it is longer than the normal breathing interval of a person. As a result as long as the person wearing the oxygen mask is breathing at or slightly below a normal rate the condenser 53 will be maintained charged, the triode 46 conducting, the relay 38 operated and the "safe" lamp 15 lit. If for any reason, however, the contacts 55—56 are not closed within a given time interval, i. e., if the person wearing the mask is breathing too slowly or the oxygen supply is interrupted, the condenser 53 will discharge. As a result, the control grids of the dual triode 46 will be biased relatively negative, the relay 38 will be de-energized, the armature 34 will move to its danger position and the "danger" lamp 16 will be lit at the central station to provide a warning signal at the remote station.

Figure 2:
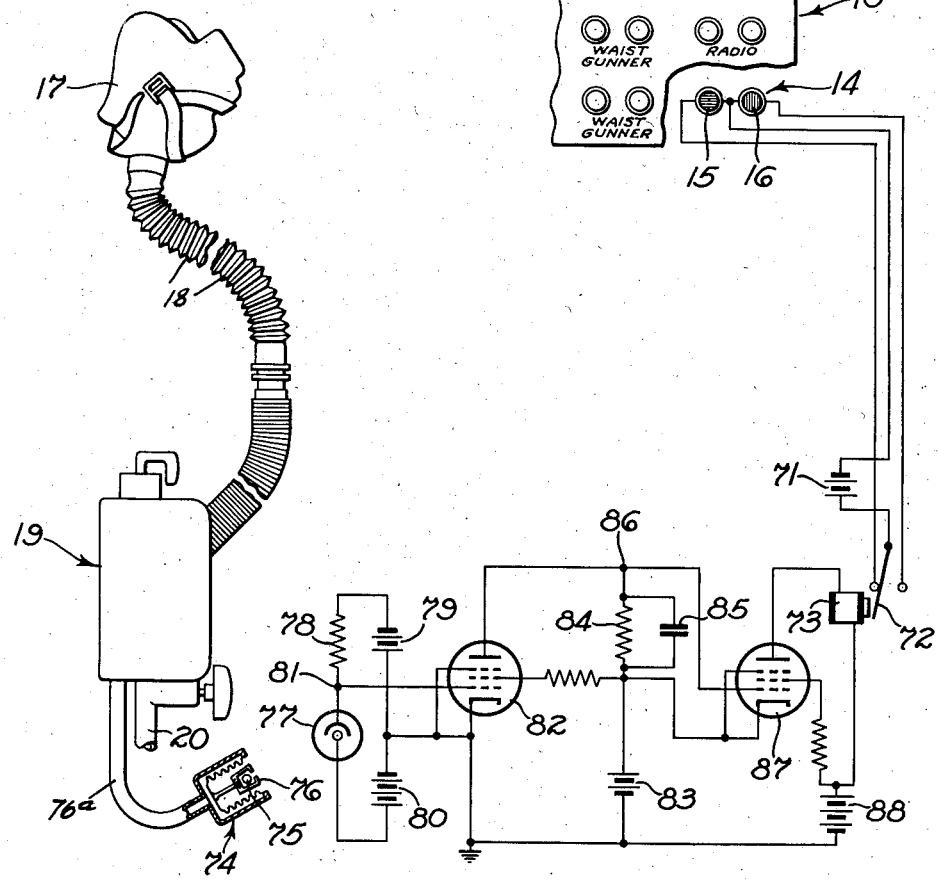
Figure 2 is a view similar to Figure 1, but illustrating a modified form of the invention.
Figure 3:
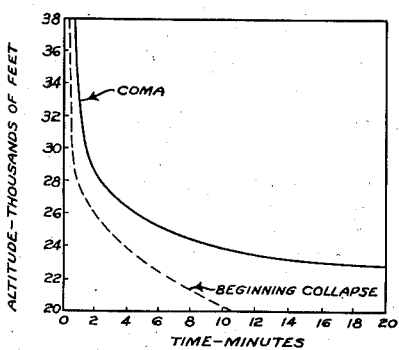
Figure 3 is a graph illustrating certain curves relating to the time interval for the progress of anoxemia at various altitudes.

*Figure 2 modification*

The modified form of the invention shown in Figure 2 is generally similar to that described above, and will be described only insofar as it differs from the foregoing described apparatus.

In Figure 2 the lamps 15 and 16 are provided with a source of direct current 71, shown as a battery, to which they may be selectively connected by means of the armature switch 72 associated with the relay 73.

The relay 73 is operated by a control circuit about to be described which, in turn, is energized by means of a blinker 74 preferably of the type used by the United States Army Air Forces and designated as Type A-3. This blinker is described on page 77 of "Physiology of Flight," a compendium of lectures and demonstrations, published in 1942 by the Aero-Medical Research Laboratory, Wright Field, Dayton, Ohio. The blinker 74 is provided with a source of light 75 and a pair of pressure-operated shutters 76 which open and close in response to pressure changes within the oxygen demand regulator 19, to which the blinker is connected through a tube 76a. The light from the source 75 is adapted to fall on the cathode of a phototube 77 when the shutters of the blinker are open. The phototube 77, with the resistor 78, is connected in series across the batteries 79 and 80 to form a divider, the midtap 81 of which is connected to the control grid of a conventional pentode discharge tube 82. The power supply for the pentode 82 may include a battery 83 having its negative terminal connected to the cathode of the pentode and its positive terminal connected through the resistor 84 in parallel with the condenser 85 and terminal 86 to the plate of the pentode 82. The plate of the pentode 82 and the terminal 86 are also connected to the control grid of a second pentode 87. The cathode of the second pentode 87 is connected to the battery 83 and its plate connected through the relay 73 to its power supply in the form of a battery 88.

*Operation of the Figure 2 circuit*

When the blinker 74 is closed to shield the light beam from light source 75, the battery 79 applies a negative bias through the resistor 78 to the control grid of the pentode 82, retaining the pentode in its normally cutoff condition. When the blinker 74 opens and the light beam falls upon the cathode of the phototube 77, the phototube becomes conductive and the midtap 81 adjacent thereto becomes relatively positive by virtue of its connection through the phototube 77 to the positive terminal of the battery 80. In this way a positive bias is applied to the control grid of the pentode 82. When the pentode 82 becomes conductive, the condenser 85 is placed on charge from the battery 83. When the tube 82 is nonconductive and the condenser 85 is discharged, the control grid of the second pentode 87 is effectively connected by way of the resistance 84 to the positive terminal of the battery 83, so that substantially no bias is applied to the control grid of the pentode 87, which is then conductive, and the relay 73 included in its plate circuit is operated to maintain the circuit closed for the "danger" lamp 15. However, when the pentode 82 is rendered conductive, as previously explained, the plate thereof is rendered relatively negative from the battery 83, effecting a negative bias of the control grid of the second pentode 87 and charging of the condenser 85, the pentode 87 being biased to cutoff, whereby the relay 73 is de-energized and the circuit for the "safe" lamp 16 is established.

Thereafter, when the pentode 82 is rendered nonconductive, that is, when the blinker 74 is closed, the negative bias applied directly to the control grid of the second pentode 87 is removed. However, at this time the condenser 85 begins discharging through its bleeder resistance 84 and maintains a negative bias upon the control grid of the second pentode 87 as long as the condenser 85 is discharging. Thus, if the blinker 74 is not again operated during the time of discharge of the condenser 85, the second pentode 87 will be again rendered conductive and the relay 73 operated to make the circuit for the "danger" lamp 15.

From the above description it will be apparent that any abnormal condition existing at one of the remote stations which would cause slowing down of the pressure fluctuations in the oxygen demand regulator or which would interfere and stop these pressure fluctuations will cause operating of the danger signal at the central station. This operation might result from undue slowness of breathing of the person wearing the mask, an initial phase of anoxemia, the loss of oxygen supply, improper removal of the oxygen mask or any other condition, such as death, which would interfere with the normal inhalations and exhalations through the oxygen mask to the oxygen demand regulator.

While the invention is primarily useful in high altitude aircraft, it is not limited to that field.

What I claim is:

1. A breathing indicator comprising, in combination, a device which responds by displacement to the rhythmic breathing of a gas; means for coupling said device to a gas mask; a circuit connected to a source of power; signaling means operated by voltage from said circuit; and means including a timing condenser controlled by displacement of said device and in turn controlling the signaling means; the signaling means being actuable to give a signal indicating danger when the breathing ceases or becomes highly irregular.

2. The invention according to claim 1, wherein the device is a blinker adapted to intermittently pass a beam of light and wherein the control means for the signal means includes a photosensitive device adapted to be energized by the light passed by the blinker.

3. Apparatus of the character described comprising, in combination, a circuit including a condenser; means for charging and discharging the condenser; an oxygen mask; a pressure-responsive device communicating with the interior of the mask; said circuit connecting the pressure-responsive device with the condenser so as to change the amount of charge on the condenser each time the pressure in the mask changes from a predetermined level in response to breathing; and indicator means responsive to the voltage across the condenser for signaling certain characteristics of the breathing taking place in the mask.

4. In combination with a central station and a remote station, a signal system comprising a breathing mask disposed at said remote station and adapted to be worn by a person thereat, means for supplying oxygen to said breathing mask, a signal means disposed at said central station, detecting apparatus including a condenser associated with said breathing mask and responsive to pressure fluctuations caused by breathing of a person utilizing said breathing mask, and indicator means including said detecting apparatus, said means being responsive to the voltage across the condenser for operating said signal means in order to indicate that abnormal pressure fluctuations have occurred at said remote station.

5. In combination with a central station and a remote station, a signal system comprising a breathing mask disposed at said remote station and adapted to be worn by a person thereat, means for supplying oxygen to said breathing mask, a pair of signals at said central station, means for selectively operating said pair of signals, detecting apparatus associated with said breathing mask and responsive to pressure fluctuations caused by a person utilizing said mask for controlling said signal operating means, said detecting apparatus including timing means for causing operation of one of said signals in response to pressure fluctuations caused by normal breathing of a person utilizing the mask and for causing operation of the other of said signals in response to interruption of said pressure fluctuations or in response to slowing of the pressure fluctuations below the interval of timing of said timing means.

6. In combination with a central station and a remote station, a signal system comprising a breathing mask disposed at said remote station and adapted to be worn by a person thereat, means for supplying oxygen to said breathing mask, signaling means at said central station, operating means for said signaling means, a control circuit including a condenser for said operating means, and breath pressure-responsive means for controlling operation of said control circuit to cause operation of said signal means in accordance with the voltage across said condenser when the rate of breathing of a person utilizing the mask falls below a given value.

7. In combination with a central station and a remote station, a signal system comprising a breathing mask disposed at said remote station and adapted to be worn by a person thereat, means for supplying oxygen to said breathing mask, signaling means at said central station, operating means for said signaling means, a control circuit for said operating means, and pressure-responsive means for applying an electrical pulse to said control circuit in response to each inhalation and exhalation of a person utilizing the mask, said control circuit including timing means responsive to said electrical pulses to control said signal operating means.

8. An oxygen supply system including a source of supply; an oxygen demand regulator connected to the source of oxygen supply; an oxygen mask connected with the oxygen demand regulator; a power circuit including a source of electric potential, signaling means, and a signal control switch normally biased to a selected one of two predetermined circuit-conditioning positions; a control circuit including a breath-pressure-responsive switch member connected with the oxygen demand regulator to be displaced with every breath inhaled and exhaled by the person wearing the mask, a timing condenser, and a voltage-controlled relay; said control circuit having electrical connection with the power circuit and the said relay being operatively associated with the signal control switch and adapted when energized by the closing of the control circuit to displace the control switch from its biased position to the other circuit-conditioning position, said relay being operatively connected with the condenser to be energized thereby when the control circuit is broken whereby after each breaking of the control circuit the relay is maintained energized to retain the control switch in its said other circuit-conditioning position for a given interval as determined by the voltage across the condenser.

CORNELIUS A. TOBIAS.

REFERENCES CITED

The following references are of record in the file of this patent:

UNITED STATES PATENTS

| Number | Name | Date |
| --- | --- | --- |
| 2,156,764 | Lyford | May 2, 1939 |
| 2,193,945 | Strauss et al. | Mar. 19, 1940 |
| 2,299,109 | Rand | Oct. 20, 1942 |
| 2,349,182 | Lesnick | May 16, 1944 |